March 29, 1960   J. R. BRASEL   2,930,344
VALVE INDICATOR

Filed Feb. 26, 1958   3 Sheets-Sheet 3

INVENTOR.
JESSE R. BRASEL
BY
Pollard, Johnston, Smythe & Robertson
ATTORNEYS.

2,930,344
Patented Mar. 29, 1960

2,930,344
VALVE INDICATOR

Jesse R. Brasel, Kewanee, Ill., assignor to Walworth Company, New York, N.Y., a corporation of Massachusetts Application February 26, 1958, Serial No. 717,643

2 Claims. (Cl. 116—125)

The invention relates to improvements in a position indicator for valves.

Summary

My invention has special advantages as applied to indicators used in conjunction with floorstands for valve operating mechanism, and can be successfully applied to indicators for geared valves or for any valve operating mechanism which includes a rotary stem or shaft. My improved indicator includes a rotor mounted for rotation with the rotary operating stem of the valve, a predetermined number of drive studs spaced around the pitch circle of the rotor for engagement with the teeth of a star gear which operates a member movable along an indicator target to show when the valve is fully opened or closed, or the extent to which it is open. By properly selecting the number of drive studs mounted on the pitch circle of the rotor and/or varying the positions of the markings on the indicator target, my indicator is made adaptable to valves requiring either a large or small number of turns of the operating stem between fully closed and fully opened positions of the valve. When the studs are few in number, i.e. widely spaced around the pitch circle of the rotor, the action of the star gear becomes intermittent, for the pointed of the indicator is moved only when one of the drive studs strikes a tooth of the star. So during the intervals between strikes the indicator pointer remains at rest. An extremely wide range of selectivity is provided by this arrangement; for example, in one floorstand indicator constructed in accordance with my invention, I have succeeded in providing for the timing of any number of turns of the main valve stem between 2 and 320. The indicator need not be disassembled when the floorstand is being connected to the valve, and the timing can be properly set in a few moments. Because the one mechanism is adaptable for substantially universal use, this will greatly reduce the requisite stocks of parts and almost entirely eliminate the special tools, dies and machine changes which have been needed to produce the types of indicator mechanism heretofore used. Other advantages of my invention will appear in the following.

Description

With reference to the drawings, I shall now describe the best mode of carrying out my invention as applied, for example, to an indicator for a floorstand.

Figure 1:
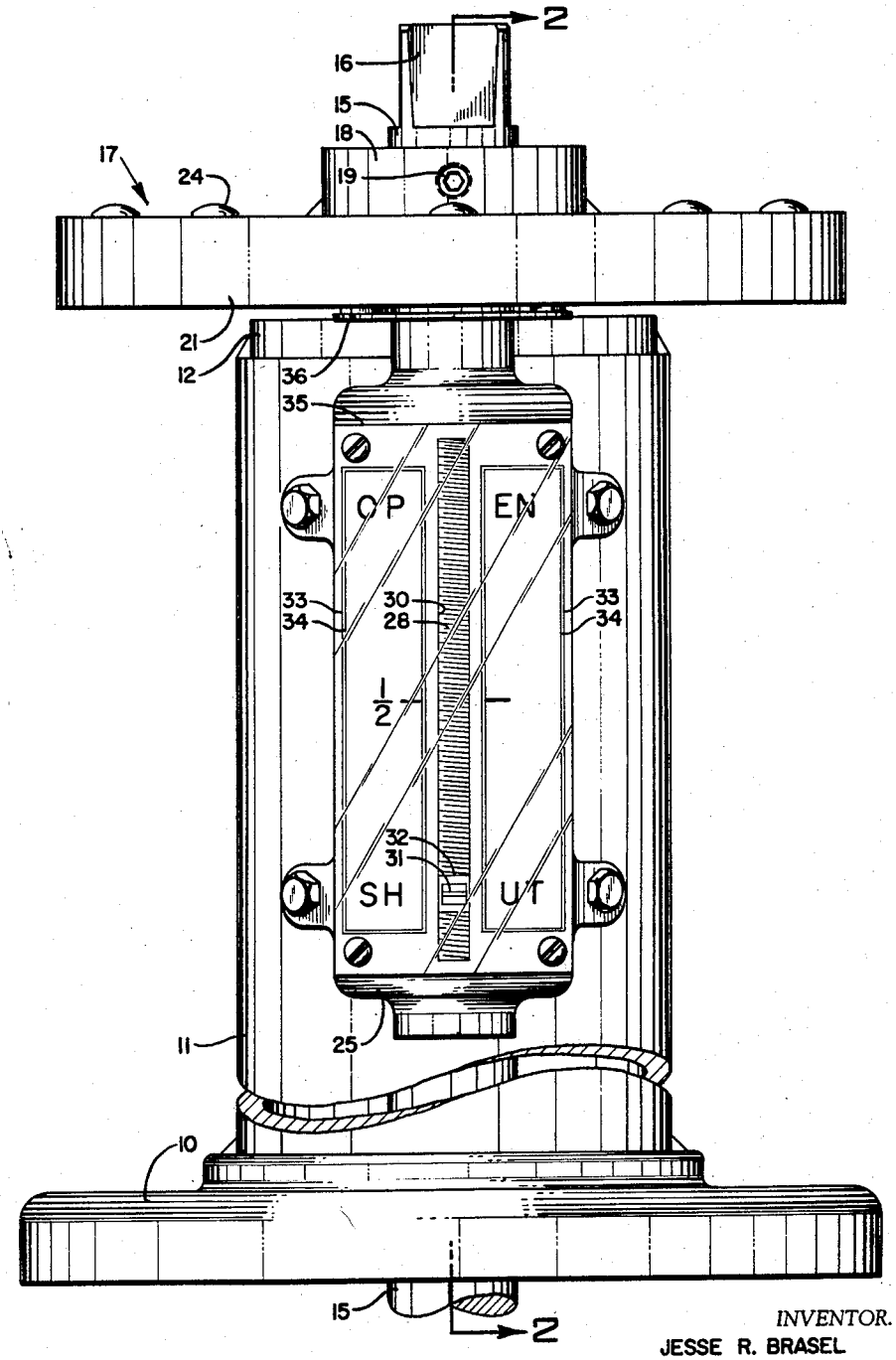
Fig. 1 is a front elevational view of my indicator as applied to such a floorstand.
Figure 2:
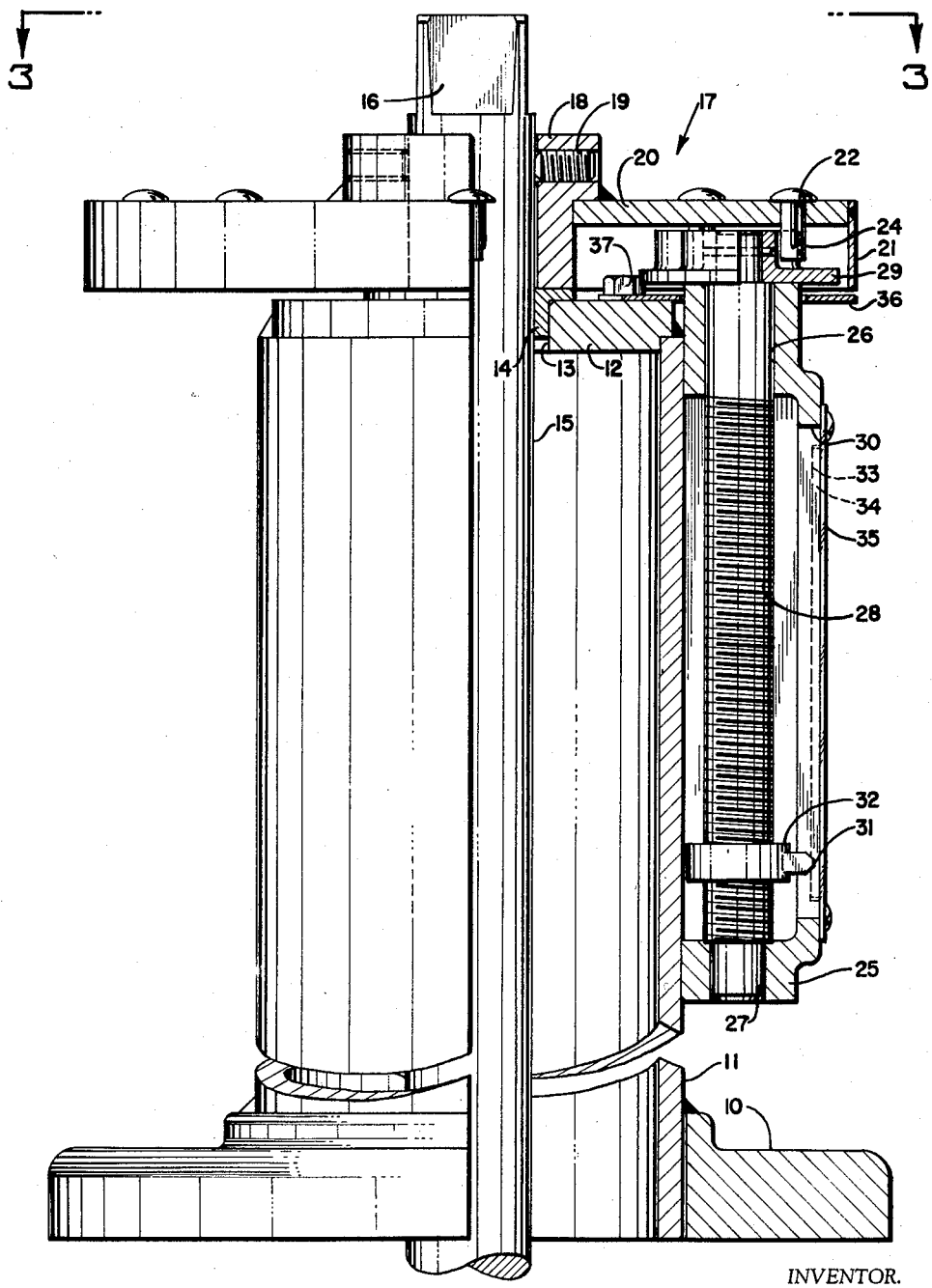
Fig. 2 is a view partly in vertical cross section on the line 2—2 of Fig. 1.
Figure 3:
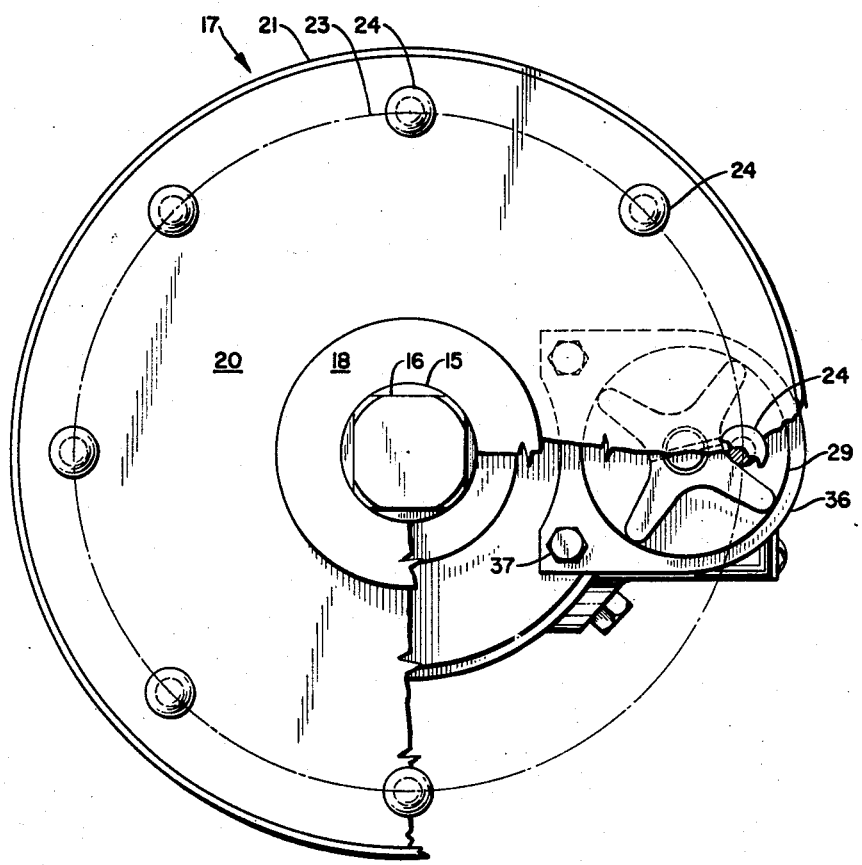
Fig. 3 is a plan view taken as indicated at 3—3 in Fig. 2, with the rotor plate partly broken away to reveal the coaction between the drive studs and the star gear.

Here we see my indicator mechanism mounted on a typical fabricated floorstand comprising a base casting 10 fixed to a tubular body 11 closed at its upper end by top plate 12, suitably secured. A hole 13 in the top plate receives a bushing 14 which provides a top bearing for the floorstand stub stem 15 through which the valve itself is operated. The stub stem is rotated by suitable means, such as a motor or handwheel coupled to, or mounted on, the upper end of the stem which is squared off as at 16 for this purpose.

The rotor 17 of my invention is here shown as built up of a shouldered hub 18 fitted to the stub stem and adjustably secured to it by a pair of set screws 19, a circular plate 20 fitted against the shoulder of the hub and fastened as by welding, and a rim 21 fastened to the periphery of the plate. A number of holes 22, equally spaced, are drilled on the pitch circle 23 of the rotor, this number being predetermined in accordance with the number of turns of stub stem 15 between open and closed positions of the valve as related to the scale of the indicator target. Drive studs 24 are fixed in holes 22 in which they may be held by virtue of a press fit or otherwise. An indicator body or casing 25 fixed to the floorstand body 11 has bearings 26, 27 in which is journalled a screw 28. The upper end of the screw extends through the end of the casing, and star gear 29 is fixed to it with the teeth of the gear disposed for engagement by drive studs 24 of the rotor.

The face of casing 25 has a slot 30 in line with the screw, and a projection 31 on nut 32 threaded on the screw extends into this slot, the projection 31 holding the nut against turning and providing a pointer to show the position of the nut as the screw causes it to travel from one end of the slot to the other. Recesses 33 at either side of the slot in the indicator body receive interchangeable targets 34 carrying suitable designations to indicate open and closed positions of the valve, half open position, etc. These indicator targets are selected in accordance with the desired extent of travel of pointer 31 as related to the number of turns of stem 15 needed to operate the valve. A transparent cover plate 35 is screwed on over the targets, holding them in place. A guard plate 36 fastened to top plate 12 of the floorstand, as by means of screws 37, extends around the end of the indicator casing and into proximity with the rim 21 of the rotor to shield the gear 29.

The rotor can be fabricated in quantities with blank hub bores and blank drive stud holes. The bore of the hub can be machined to suit the required stub stem, and the number of drive stud holes required for the particular valve can be drilled with a jig having the maximum permissible number of holes. The holes can then be drilled to provide the required number thereof on the pitch circle of the rotor.

By my invention there is provided a position indicator for valve operating means including a rotary operating stem 15, this indicator comprising a member 32 movable along an indicator target 34 to indicate extent of valve opening, means for driving such movable member including a star gear 29, a rotor 17 having a predetermined number of drive studs 24 spaced around the pitch circle 23 of the rotor for engagement with the teeth of the star gear, the rotor being provided with means for mounting it for rotation with the rotary operating stem. The indicator is adaptable to valves requiring a greater or smaller number of turns of the rotary operating stem between fully closed and fully opened positions of the valve by selection of different numbers of drive studs on the pitch circle of the rotor and/or varying the positions of the markings on the indicator target.

The terms and expressions which I have employed are used in a descriptive and not a limiting sense, and I have no intention of excluding such equivalents of the invention described, or of portions thereof, as fall within the scope of the claims.

I claim:
1. A universal position indicator for valve operating means including a rotatable operating stem and a stem supporting member, said indicator comprising a rotor removably attached to said stem for rotation therewith, a predetermined number of removable spaced drive studs carried by said rotor, each of said drive studs being the same radial distance from the axis of said stem, a star gear rotatably mounted on said stem supporting member, the axis of said star gear being spaced from the axis of said stem a different radial distance than the radial distance between the axis of said stem and said drive studs and being located so that when the rotor is rotated by said stem the drive studs engage the star gear to cause rotation thereof, and indicating means operated by the rotation of said star gear, said indicator being adaptable to valves requiring a different number of turns of the stem between fully closed and fully opened positions of the valve by selection of different numbers of drive studs thereby permitting retention of the same star gear with its axis the same distance from the axis of said stem.

2. A universal position indicator for valve operating means including a rotatable operating stem and a stem supporting member, said indicator comprising a rotor removably attached to said stem for rotation therewith, a predetermined number of removable spaced drive studs carried by said rotor, each of said drive studs being the same radial distance from the axis of said stem, a star gear rotatably mounted on said stem supporting member, the axis of said star gear being spaced from the axis of said stem a different radial distance than the radial distance between the axis of said stem and said drive studs and being located so that when the rotor is rotated by said stem the drive studs engage the star gear to cause rotation thereof, an indicator target, and an indicator pointer operatively connected to said star gear so that as said star gear is rotated by said drive studs said indicator pointer is moved along said indicator target, said indicator being adaptable to valves requiring a different number of turns of the stem between fully closed and fully opened positions of the valve by selection of different numbers of drive studs thereby permitting retention of the same star gear with its axis the same distance from the axis of said stem.

References Cited in the file of this patent

UNITED STATES PATENTS

| | | |
|---|---|---|
| 467,796 | Ferrell | Jan. 26, 1892 |
| 2,768,604 | Enerud | Oct. 30, 1956 |